Figures 1, 2:
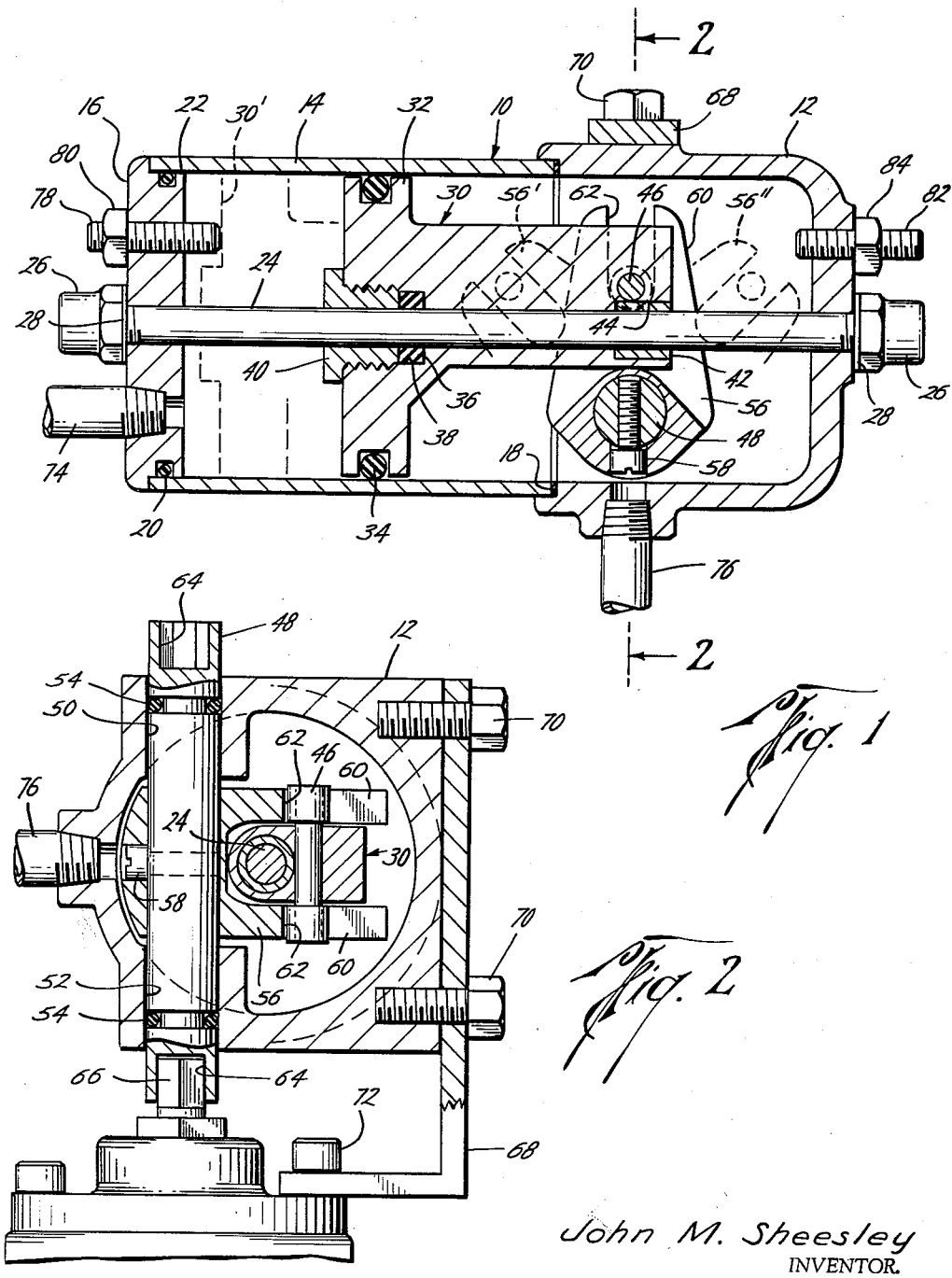

Sept. 24, 1963     J. M. SHEESLEY     3,104,592

CENTER BAR ACTUATOR

Filed Oct. 19, 1961

John M. Sheesley
INVENTOR.

BY

ATTORNEY

United States Patent Office 3,104,592
Patented Sept. 24, 1963

3,104,592
CENTER BAR ACTUATOR
John M. Sheesley, P.O. Box 9365, Houston, Tex.
Filed Oct. 19, 1961, Ser. No. 146,134
10 Claims. (Cl. 92—13)

This invention relates to fluid operated means for actuating valves, particularly plug valves and other valves which are operated by no more than about 90 degrees rotation of the stem.

It is well known in the art to provide air or hydraulic actuators for operating plug valves and similar valves which are operated by a 90 degree turn of the stem, but valve actuators heretofore furnished have been so complex that often the cost to the user of the actuator is greater than the cost of the valve itself. Furthermore valve actuators heretofore furnished have been subject to comparatively rapid wear so that maintenance costs are often unduly high. In addition because of the particular type of assemblies used, friction within the actuator itself has often been so high that excessively high pressures are required to operate the valves.

It is an object of this invention to provide a comparatively simple fluid operated means for actuating valves.

It is another object of this invention to provide a valve actuator which is constructed in such a manner that wear is comparatively low.

Still another object of this invention is to provide a valve actuator in which the friction between moving parts is so low that substantially all of the fluid pressure is utilized in operating the valve.

The accomplishment of these and other objects of the invention will become more apparent on consideration of the following description and the accompanying drawing, wherein:

FIGURE 1 is a longitudinal sectional view of a preferred embodiment of the valve actuator of this invention, and FIGURE 2 is a transverse sectional view of the embodiment of FIGURE 1 taken at line 2—2 of FIGURE 1.

As is shown in FIGURE 1, the valve actuator of this embodiment is enclosed within a closed end cylindrical housing indicated generally at 10. The housing comprises a cup-shaped body member 12, a cylinder 14, and a cylinder head 16. As is shown, the cylinder 14 abuts the open end of the body member 12 and is sealingly engaged therewith by means of gasket 18. Similarly cylinder head 16 covers the other end of the cylinder 14 and is sealingly engaged therewith by sealing means, as for example the O-ring 20, which surrounds a reduced diameter portion 22 of the cylinder head extending into the cylinder 14. The three elements of the housing 10 are held in this relationship by means of an axially extending tie rod 24 which extends through the closed end of body member 12 and through the cylinder head 16. Tie rod nuts 26 on either end of the tie rod 24 serve, upon tightening, to pull the three elements of the housing together. Sealing elements such as gaskets 28 interposed between the tie rod nuts and the body member and cylinder head respectively insure that the housing is fluid tight.

Tie rod 24 also functions as a piston rod on which a piston indicated generally at 30 is slidably mounted for longitudinal movement. Piston 30 comprises a head portion 32 on one end which is slidingly engaged within the cylinder 14. A piston sealing element such as O-ring 34 circumscribes the piston head to provide sealing between the head and the cylinder. A packing element 36 positioned within a counterbore 38 within the piston near the head end provides a fluid tight seal between the piston and the tie rod. A piston guide bushing 40 is threadedly engaged within the head end of the piston and surrounding and in sliding engagement with the tie rod. This guide bushing functions to provide adjustment for the packing 36 and in addition acts as a sleeve bearing. Preferably the guide bushing is made of Oilite bronze or other suitable bearing material. Additional bearing means are provided in the opposite end of the piston, and this means comprises a sleeve bearing 42, also preferably made of Oilite bronze or similar bearing material, which is mounted within a counterbore 44 in the piston.

A yoke and pin mechanism provides translation of the longitudinal movement of the piston to rotary movement which is transmitted to the stem of the valve to be actuated. A pin 46 extends transversely of the piston, preferably adjacent the end of the piston opposite the head end. As is shown in FIGURE 2, pin 46 extends beyond the piston on either side thereof. A shaft 48 extends transversely of the housing and preferably extends beyond both sides of the housing and is positioned to one side of the axis of the housing so as to clear the piston and the tie rod. The shaft is rotatably mounted within aligned apertures 50 and 52 in the housing and is sealingly engaged in the apertures as by means of O-rings 54. A yoke 56 is mounted on the shaft within the housing and is fixed for rotation with the shaft by means of a cap screw 58. The yoke 56 is provided with a pair of fingers 60 which extend on either side of the piston and each of the fingers 60 has a longitudinal slot 62 adapted to slidably receive the respective ends of pin 46.

Each end of the shaft 48 is provided with a socket 64 which is adapted to engage the stem 66 of a valve to be actuated, for rotation therewith. The valve actuator is mounted on the valve, in the embodiment shown, by means of a bracket 68 which is attached to the actuator with cap screws 70 and to the valve by means of valve cover bolts 72.

It will be apparent that fluid under pressure is applied to the left side of the piston, as viewed in FIGURE 1, by means of fluid conduit 74 which supplies fluid through the cylinder head 16. Similarly fluid is supplied to the right side of the piston 30, as viewed in FIGURE 1, through fluid conduit 76 which supplies fluid through the body member 12. A stud 78 extends longitudinally of the housing through the cylinder head 16 and an adjusting nut 80 is affixed thereon to provide a stop to limit the leftward travel of the piston. Similarly a stud 82 and adjusting nut 84 on the other end of the housing provides an adjustable limit stop for the piston to limit movement to the right.

In operation it will be seen that if the piston is originally in the position shown by the dotted lines at 30' against adjusting stud 78 and if fluid pressure is applied through conduit 74 the piston will be moved to the right, as viewed in FIGURE 1. Initially the fingers of the yoke 56 will be at the position shown in dotted lines at 56'. As the piston is moved to the right the engagement of pin 46 with the sides of slots 62 will cause the yoke to pivot about shaft 48. Thus, if the piston is moved all the way to the right against stop 82, the yoke will be pivoted approximately 90 degrees in the embodiment shown in the drawing. The yoke will then be in the position shown at 56" in FIGURE 1. Similarly the application of fluid pressure through fluid conduit 76 will cause the piston to move to the left and therefore pivot the yoke in the opposite direction. It will be apparent that this pivoting of the yoke, which is rigidly affixed to shaft 48, will cause the shaft to rotate through approximately 90 degrees and thereby to rotate the valve to open or close it.

It will be noted that the use of means for translating the longitudinal motion of the piston to rotary motion of the shaft causes radial loading on the piston during the actuation of the valve, due to the fact that, in the embodiment shown, the pin 46 bears at an angle varying from 45 degrees to 90 degrees against the sides of the slots 62, so that the force on the piston has both longitudinal and radial components. Such radial loads are present in substantially all means previously used for translating longitudinal to rotary motion and is not limited simply to pin and yoke mechanisms. However in such prior art devices the forces of these radial loads have been applied between the cylinder bore and the flange or head of the piston so that there is a tendency to move the piston head off center of the cylinder and thereby to greatly accentuate the wear on one side of the piston head, and on one side of the cylinder bore. This causes the piston head to wear much more rapidly than would be the case if such radial loading were limited. The present invention eliminates this effect of excessive loading on one side of the piston head, in that all the radial loading is absorbed within the center tie rod on which the piston is moved longitudinally during the actuation. It will be noted that by means of the piston guide bushing 40 and the sleeve bearing 42, which are preferably made of material having a low coefficient of friction, a relatively low frictional resistance is present between the piston and tie rod.

Thus it will be apparent that the tie rod of this apparatus serves two functions. One of these functions is to hold together the elements of the housing and the other function is as a guide for the piston.

The apparatus of this invention has been shown and described herein in terms of its application to valves, wherein longitudinal motion is translated to rotary motion. It is apparent, however, that the apparatus is also useful in actuating other equipment which is actuable by a rotary motion of no more than about 90 degrees.

Many other advantages of this invention will be apparent to those skilled in the art. Furthermore those skilled in the art will recognize many modifications of the present invention. In view of this the invention is not limited to the specific embodiment disclosed and described herein but only as set forth by the following claims.

I claim:
1. An actuating device comprising
   a substantially cylindrical housing,
   means for providing fluid under pressure to each end of said housing,
   a rod extending longitudinally of said housing and affixed to said housing at each end,
   a piston longitudinally slidably disposed within said housing and on said rod,
   a shaft rotatably disposed transversely through said housing,
   means on one end of said shaft adapted to be attached to apparatus to be actuated,
   and a mechanism connecting said piston and said shaft adapted to convert longitudinal movement of said piston to rotary motion of said shaft.
2. An actuating device comprising
   a pressure tight housing having a body portion, a cylinder portion, and a head portion in successive axial alignment and in sealing engagement with each other,
   means for providing fluid under pressure to each end of said housing,
   a shaft rotatably disposed transversely of said body,
   means on said shaft adapted to engage apparatus to be actuated for rotation therewith,
   a piston longitudinally slidably disposed in said housing,
   a longitudinal bore in said piston,
   a bushing at each end of said bore made of a material having a low coefficient of friction,
   an axial tie rod extending longitudinally through said housing and through said bore, the diameter of said bore being such as to provide sliding engagement with said tie rod,
   and mechanism connecting said piston and said shaft adapted to translate longitudinal movement of said piston into rotary movement of said shaft.
3. A valve actuator as defined by claim 2, wherein said mechanism comprises a pin extending transversely of said piston, and a yoke rigidly attached to said shaft and slidably engaging said pin.
4. A valve actuator comprising
   a pressure tight housing having a body portion, a cylinder portion, and a cylinder head portion in successive axial alignment and in sealing engagement with each other,
   means for providing fluid under pressure to each end of said housing,
   a tie rod extending longitudinally through said housing and rigidly retaining said body portion, said cylinder portion, and said cylinder head portion in sealing engagement with each other,
   a piston longitudinally slidably disposed within said housing and on said tie rod,
   a shaft rotatably disposed transversely of said housing,
   means on said shaft adapted to engage the stem of a valve for rotation therewith,
   and mechanism connecting said piston and said shaft adapted to translate longitudinal movement of said piston into rotary movement of said shaft.
5. A valve actuator comprising
   a pressure tight housing having a portion forming a cylinder,
   means for providing fluid under pressure to each end of said cylinder,
   an axially extending rod in said housing extending through said cylinder and fixed against longitudinal movement with respect thereto,
   a piston slidingly and sealingly engaging said cylinder and said rod,
   a shaft rotatably disposed transversly of said housing,
   means on said shaft adapted to engage the stem of a valve for rotation therewith,
   and mechanism connecting said piston and said shaft adapted to translate longitudinal movement of said piston into rotary movement of said shaft.
6. A valve actuator as defined by claim 5 wherein said mechanism comprises a pin extending transversely of said piston,
   and a yoke rigidly attached to said shaft and slidably engaging said pin.
7. A valve actuator as defined by claim 6, wherein said housing comprises a body portion, a cylinder portion, and a cylinder head portion in successive axial alignment and in sealing engagement with each other, and said rod provides means for retaining said portions in such sealing engagement.
8. A valve actuator as defined by claim 7, including means at each end of said housing for limiting the longitudinal movement of the piston.
9. A valve actuator as defined by claim 6, wherein said piston is provided with a bore through which said rod extends,
   and a bearing means at each end of said bore providing sliding bearing engagement of said piston with said rod,
   whereby radial loading on said piston is absorbed by said rod and not by said cylinder.

10. A valve actuator as defined by claim 5 wherein said piston is provided with a bore through which said rod extends,
and bearing means at each end of said bore providing sliding bearing engagement of said piston with said rod,
whereby radial loading on said piston is absorbed by said rod and not by said cylinder.

References Cited in the file of this patent

UNITED STATES PATENTS

| | | |
|---|---|---|
| 2,269,382 | Schmidt | Jan. 6, 1942 |
| 2,688,258 | Haynes et al. | Sept. 7, 1954 |
| 2,770,984 | Loecy | Nov. 20, 1956 |

FOREIGN PATENTS

| | | |
|---|---|---|
| 838,647 | Great Britain | June 22, 1960 |